United States Patent
Schowtka et al.

(10) Patent No.: US 7,322,007 B2
(45) Date of Patent: Jan. 22, 2008

(54) ELECTRONIC DOCUMENT MODIFICATION

(75) Inventors: Alexander K. Schowtka, Weston, MA (US); Eliza H. Royal, Lincoln, MA (US); Daniel R. Malone, Arlington, MA (US); Robert L. Dulaney, Paxton, MA (US)

(73) Assignee: VistaPrint Technologies Limited, Hamilton (BM)

( * ) Notice: Subject to any disclaimer, the term of this patent is extended or adjusted under 35 U.S.C. 154(b) by 340 days.

(21) Appl. No.: 10/449,836

(22) Filed: May 30, 2003

(65) Prior Publication Data
US 2004/0243930 A1    Dec. 2, 2004

(51) Int. Cl.
*G06F 15/00* (2006.01)
*G06F 17/00* (2006.01)

(52) U.S. Cl. ............ 715/513; 715/517; 715/542

(58) Field of Classification Search ........ 715/513, 715/517, 542
See application file for complete search history.

(56) References Cited

U.S. PATENT DOCUMENTS

| | | | |
|---|---|---|---|
| 5,552,994 A | 9/1996 | Cannon et al. | |
| 5,774,570 A * | 6/1998 | Toju et al. | 382/112 |
| 5,930,811 A | 7/1999 | Nojima et al. | |
| 6,031,622 A * | 2/2000 | Ristow et al. | 358/1.11 |
| 6,278,462 B1 * | 8/2001 | Weil et al. | 345/619 |
| 6,734,871 B2 * | 5/2004 | Weil et al. | 345/619 |
| 6,895,552 B1 * | 5/2005 | Balabanovic et al. | 715/513 |
| 2001/0054050 A1 * | 12/2001 | Weil et al. | 707/517 |
| 2002/0036788 A1 * | 3/2002 | Hino | 358/1.11 |
| 2004/0019610 A1 * | 1/2004 | Burns | 707/104.1 |
| 2004/0205514 A1 * | 10/2004 | Sommerer et al. | 715/501.1 |

FOREIGN PATENT DOCUMENTS

WO    WO 01/11491 A1    2/2000

OTHER PUBLICATIONS

Weinmann, Elaine et al.; Photoshop 7 for Windows and Macintosh: Visual QuickStart Guide; Publisher: Peachpit Press; Pub Date: Aug. 16, 2002; pp. 1-8☐☐.*

* cited by examiner

*Primary Examiner*—Doug Hutton
*Assistant Examiner*—N Hillery
(74) *Attorney, Agent, or Firm*—Robert Dulaney (57) ABSTRACT

Electronic document design methods and computer programs allowing a user to separately control and modify layout and the design components of an electronic document. A number of possible document layouts and possible document designs are stored. A document is based on the combination of one of the stored layouts and one of the stored designs. While the user is viewing the electronic document, controls are available to the user allowing the user to view and select among alternate layouts and designs for that document. Color schemes and font schemes for the document may also be separated controlled.

12 Claims, 12 Drawing Sheets

ELECTRONIC DOCUMENT MODIFICATION

FIELD OF THE INVENTION

The present invention relates to electronic document design and editing.

BACKGROUND OF THE INVENTION

Desktop publishing applications allowing a user to create electronic documents on the user's personal computer are widely known and established. A copy of the desktop publishing application is typically installed on the user's computer system and stored in the user's computer memory until activated for use by the user. Desktop publishing products of this type must be licensed and paid for prior to or at the time that the product is installed.

Many people or businesses that occasionally have a need to create custom products, such as business cards, postcards, brochures and the like, have historically been required to either purchase, install and learn to operate a desktop publishing application, which they may need only infrequently, or go to the trouble and expense of identifying, visiting and trying to convey their requirements and desires to a print shop employee or graphic designer.

In recent years, another option has become available for the large number of people whose custom document needs have not been well or economically served by the other avenues that had been available. Among the many new businesses that are taking advantage of the capabilities of the Web and modern Web browsers are service providers that provide document design services for users desiring to create customized electronic documents from the user's computer at whatever time and place is convenient to the user. These service providers typically provide their customers with the ability to access the service provider's web site, download product templates and a product design program, create a customized markup language document in the browser of the user's computer system, and upload the document to the printing service provider's server. After the document has been designed by the user, Web-based service providers also typically allow the user to place an order for the production and delivery to the user's home or business of quantities of high quality, printed documents of the type that the user is not capable of producing with the printer systems typically connected to most personal computer systems.

One network-based product design system is disclosed in U.S. Pat. No. 6,247,011 entitled "Computerized Prepress". The patent discloses a document-authoring tool that is downloaded from a server and runs in the client browser. The tool allows the user to create a markup language version of a product intended for uploading to the server for subsequent printing. Another system is disclosed in co-pending and co-owned U.S. application Ser. No. 09/557,571 entitled "Managing Print Jobs", which is hereby incorporated by reference. The system discloses a downloadable editing tool that allows a customer to create and edit WYSIWYG ("what you see is what you get") markup language documents in the customer's browser. The system makes a number of pre-designed product templates available for customer viewing, downloading, and customizing. The customer can upload the electronic document to a server and place an order for production of the printed products.

Web-based service providers display pre-designed document templates that can be individually selected and downloaded by a user to assist the user in creating a document in the user's browser. The service provider typically has prepared a number of different templates to offer the user a range of choices. The user can review the available templates and select one that contains a combination of design features that appeal to the user. The selected template is downloaded to the user's computer system along with downloaded software tools that can be employed by the user to create a personalized electronic document.

Despite the popularity and substantial use of the Web, certain document editing abilities have not been successfully implemented. After a user has selected a desired template, the document editing by the user is generally limited to positioning textboxes, entering and modifying text in a textbox, and uploading and positioning of the user's images. If the product design templates offered by the service provider are not exactly what the user is looking for, the limited ability to customize may cause the user to go elsewhere or be less than fully satisfied by having to settle for a product design that doesn't quite capture the user's vision. For some potential customers, this has limited the desirability of performing document creation on the Web. There is therefore a need for a system and method to provide users of Web-based document creation systems with enhanced and more powerful customizations tools and techniques.

Even in the more hospitable and controllable operating environment experienced by traditional desktop publishing products, some document editing capabilities have not been realized. Some traditional desktop publishing products have employed the idea of dividing the structure of the document into separate component parts, typically identified as the document layout and the document design, where the layout relates generally to the location and size of the areas of the document devoted to text and the design relates to other elements, such as the images, color scheme, borders, background effects, and the specific font family and font attributes. This prior art layout/design approach to involves the changing of the location of document text without making a corresponding or compensating change in the position of document images or other design features. This can result in unsatisfactory results with text overlapping with design elements in a manner that interferes with readability or is otherwise undesirable.

Further, while some desktop publishing products allow a document layout, design, color scheme and font scheme to be separately selected and controlled, the user is typically forced to make the selection decision based on a set of small generic images. Because the images are completely generic, the user is faced with the problem of surveying the generic images and trying to visualize how the user's document might look. The user may be reduced to repetitively asking to view a display of the generic image options, selecting one of the images, viewing the resultant impact on the document, asking again to see the display of the generic image options, selecting another image, viewing the impact, and so forth until the user ultimately hits upon a result that is satisfactory. Therefore, there is a further need for a more efficient and user-friendly system and method for allowing a user to consider and select among customization choices for the user's document.

SUMMARY

The present invention is directed to satisfying the need for programs and methods that provide a user engaged in editing an electronic document with improved and more flexible capabilities for reviewing and selecting available alternative layouts and designs for the document.

In accordance with the invention, an electronic document displayed to a user is based on the combination of a document layout and a document design. A number of possible document layouts and designs for the document are retained.

In accordance with aspects of the invention, the color scheme and the font scheme of the document may also be controlled and modified independently.

In accordance with yet another aspect of the invention, images indicating various available layout and design combinations are displayed to the user upon user request.

It is an advantage of the invention that assembling a document from separate layout and design components provides the user with increased flexibility and control over the user's document.

It is another advantage of the invention that storing a plurality of alternative layouts and designs for a document allows the user to readily select among a range of pre-designed document options.

It is yet another advantage that presenting the user with preview images based on the stored document layouts and designs provides the user with a more realistic representation of how the document would appear.

These and other objects, features and advantages of the invention will be better understood with reference to the accompanying drawings, description and claims.

DETAILED DESCRIPTION

Figure 1:
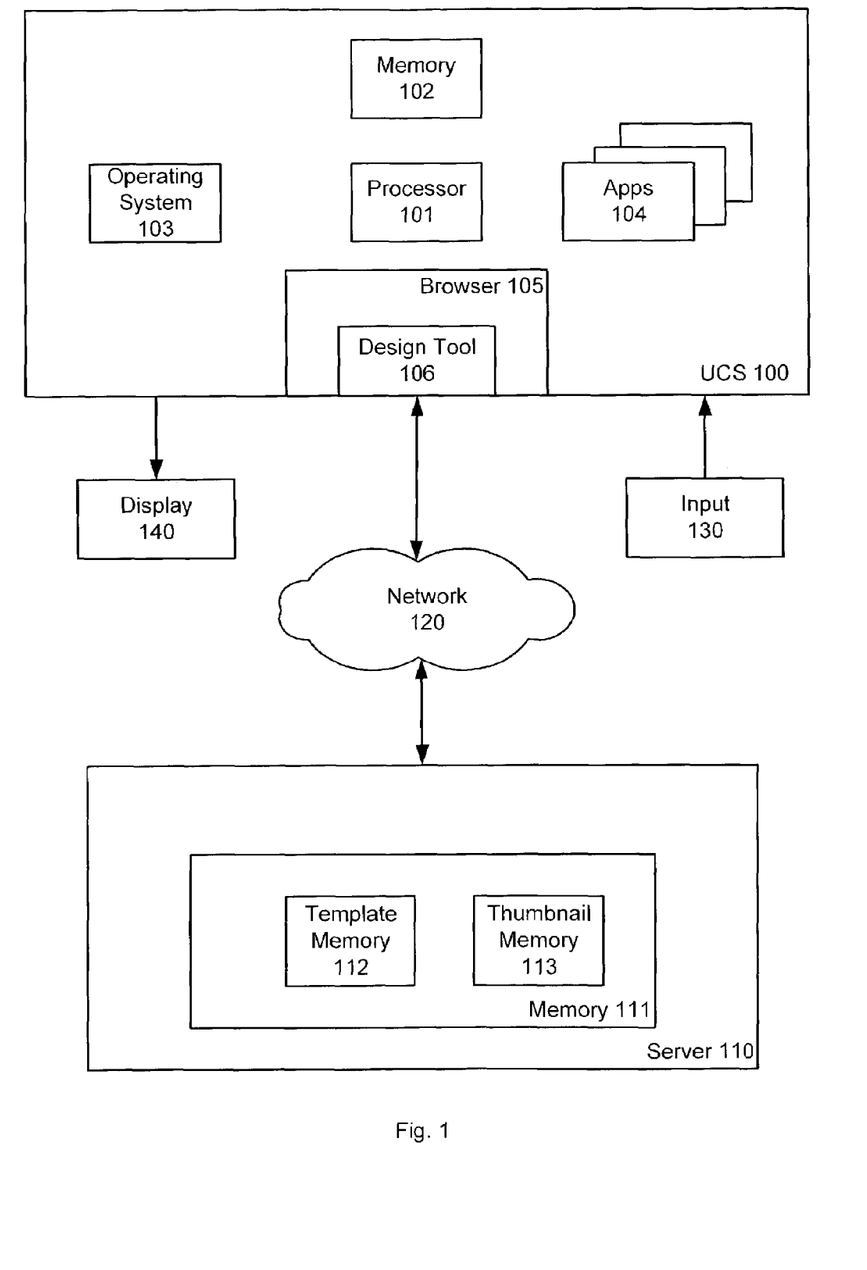
FIG. 1 is a block diagram of a system suitable for practicing the invention

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer or other device. The user views images from UCS 100 on display 140, such as a CRT or LCD screen, and provides inputs to UCS 100 via input devices 150, such as a keyboard and a mouse.

When UCS 100 is operating, an instance of the USC 100 operating system will be running, represented in FIG. 1 by Operating System 103. In addition, the user may be running one or more application programs. In FIG. 1, UCS 100 is running Web browser 105, such as Internet Explorer from Microsoft Corporation. Other applications that may be running in USC 100, such as spreadsheet, e-mail, and presentation programs, are represented as applications 104. In the exemplary embodiment, design tool 106 is a document design program downloaded to UCS 100 via network 120 from remote server 110. Design tool 106 runs in browser 105 and allows the user to prepare a customized document design in electronic form. Alternatively, design tool 106 could have been obtained by the user from memory 102 or from another local source. When the customer is satisfied with the design, the design can be uploaded to server 110 for storage and subsequent production of the desired quantity of the physical product on appropriate printing and post-print processing systems.

While server 110 is shown in FIG. 1 as a single block, it will be understood that server 110 could be multiple servers configured to communicate and operate cooperatively. Memory 111 represents all components and subsystems that provide server data storage, such as RAM, ROM, and disk drives or arrays. As will be discussed in more detail below, template memory 112 contains the descriptive information required by design tool 106 to render a plurality of document templates in browser 105. In some embodiments of the invention discussed below, memory 111 also contains thumbnail image memory 113.

Figure 2:
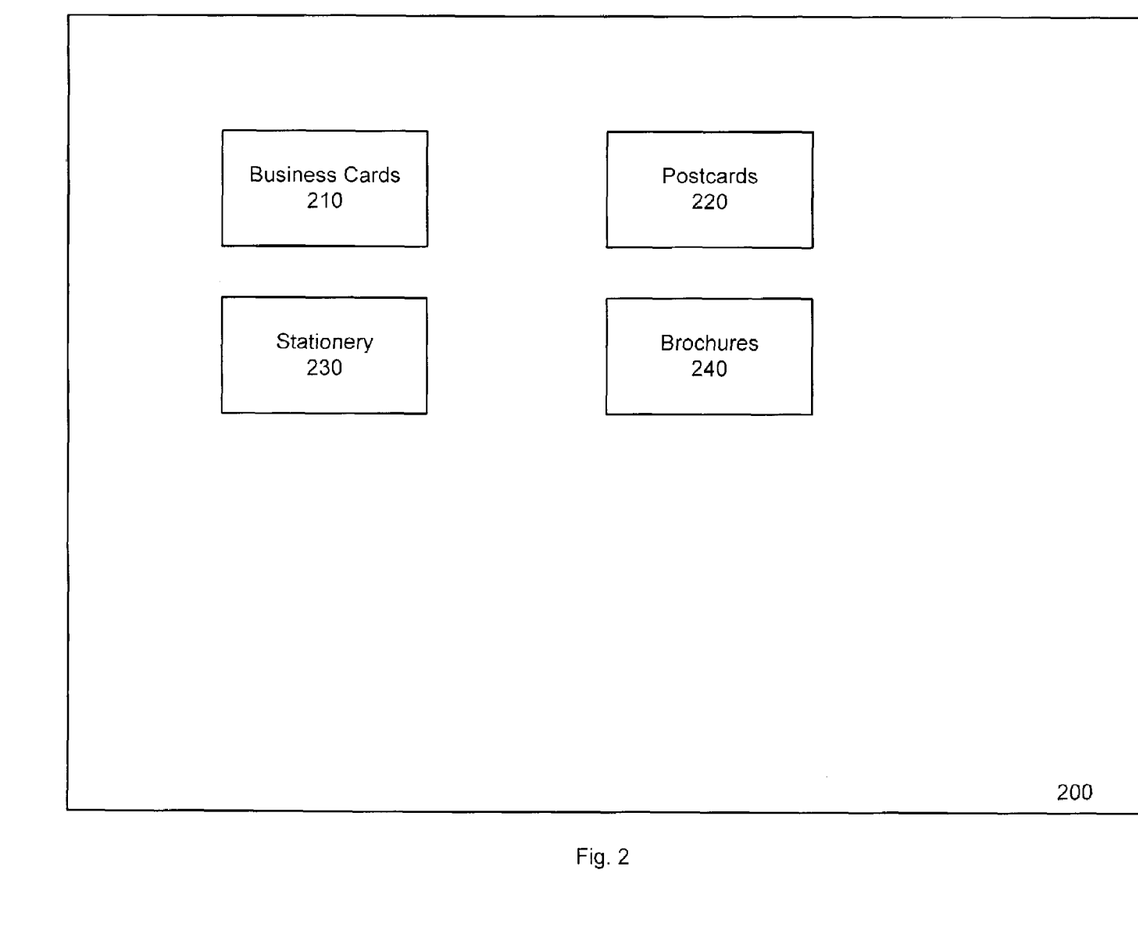
FIGS. 2-11 are schematic representations of displays available for viewing by a user of UCS 100 on display 140 during the creation of an electronic document.

In FIGS. 2-11, screen 200 represents the display being viewed by the user of UCS 100 on display 140. In FIG. 2, screen 200 is representative of an introductory page provided by a Web-based electronic document design service provider. The page displays and promotes various types of products available from the service provider and offers active controls that allow the user of UCS 100 to select a desired type of product for a more detailed presentation of design options. In this example, FIG. 2 shows business cards 210, postcards 220, stationery 230, and brochures 240. Images or promotions for additional products, such as return address labels, presentation folders, invitations, announcements, thank you cards, gift tags, and so forth could also be presented on the screen along with other information and links. It will be understood that the invention is not limited to documents that are intended for eventual printing. The invention is also applicable to the design of documents intended for use in electronic form, such as electronic business cards, online brochures, and templates for presentation graphics software programs. The invention could as well be readily adapted to a wide range of products that a user may wish to customize, such as items of clothing, product containers, promotional goods, and so forth.

Figure 3:
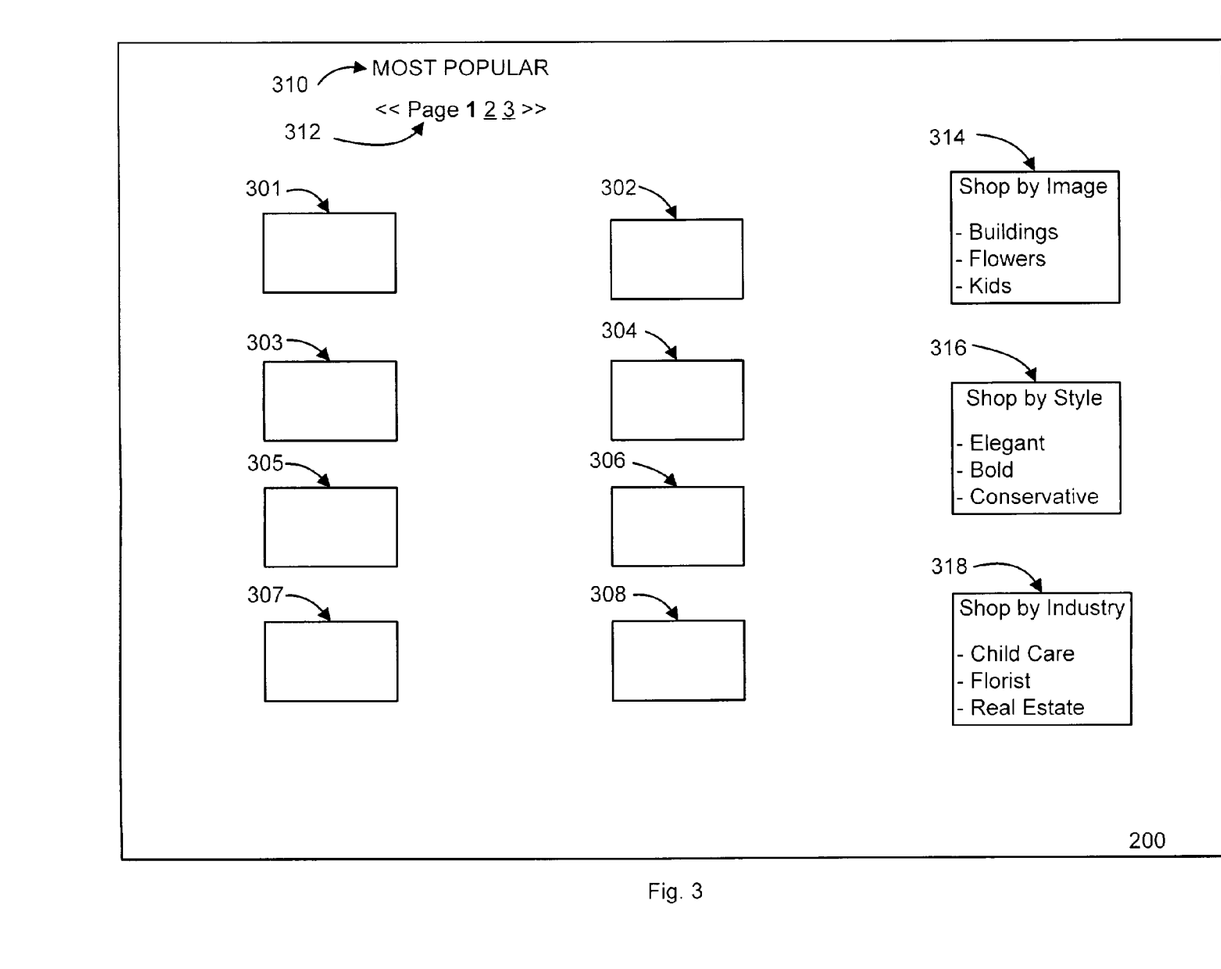

For the purpose of illustration, it will be assumed that the user of USC 100 desires to create a custom business card and, therefore, selects the business card 210 option, for example by clicking with the mouse cursor on the business cards 210 image. Referring to FIG. 3, in response to the user's selection of 210, a page directed specifically to business cards is retrieved from server 110 and displayed to the user. On this page, the user is presented with eight thumbnail images 301-308 of sample business cards. Each thumbnail image 301-308 represents a different business card template that has been pre-designed by the service provider. Each image contains various component images, graphics, colors and arrangements to give the user a range of visual appearances from which to choose and to provide the user with a starting point for the user's customization to create a personalized document. To provide a broad range of choices, a large number of pre-designed product images are made available for review by users. To provide a starting point for the user's selection process, the initial eight images are indicated to the user by legend 310 as being in the category identified by the service provider as Most Popular. Navigation control 312 indicates to the user that images 301-308 represent the first page of three pages in this category. To allow the user to quickly locate card templates of the type desired by the user, the user is offered additional navigation areas 314, 316 and 318 in this example. Each navigation area contains links to sets of card templates that the service provider has grouped according to specific images, e.g., buildings, flowers, kids, or specific styles, e.g., elegant, bold, conservative, or specific types of business activities, e.g. child care, florist, real estate.

Figure 4:
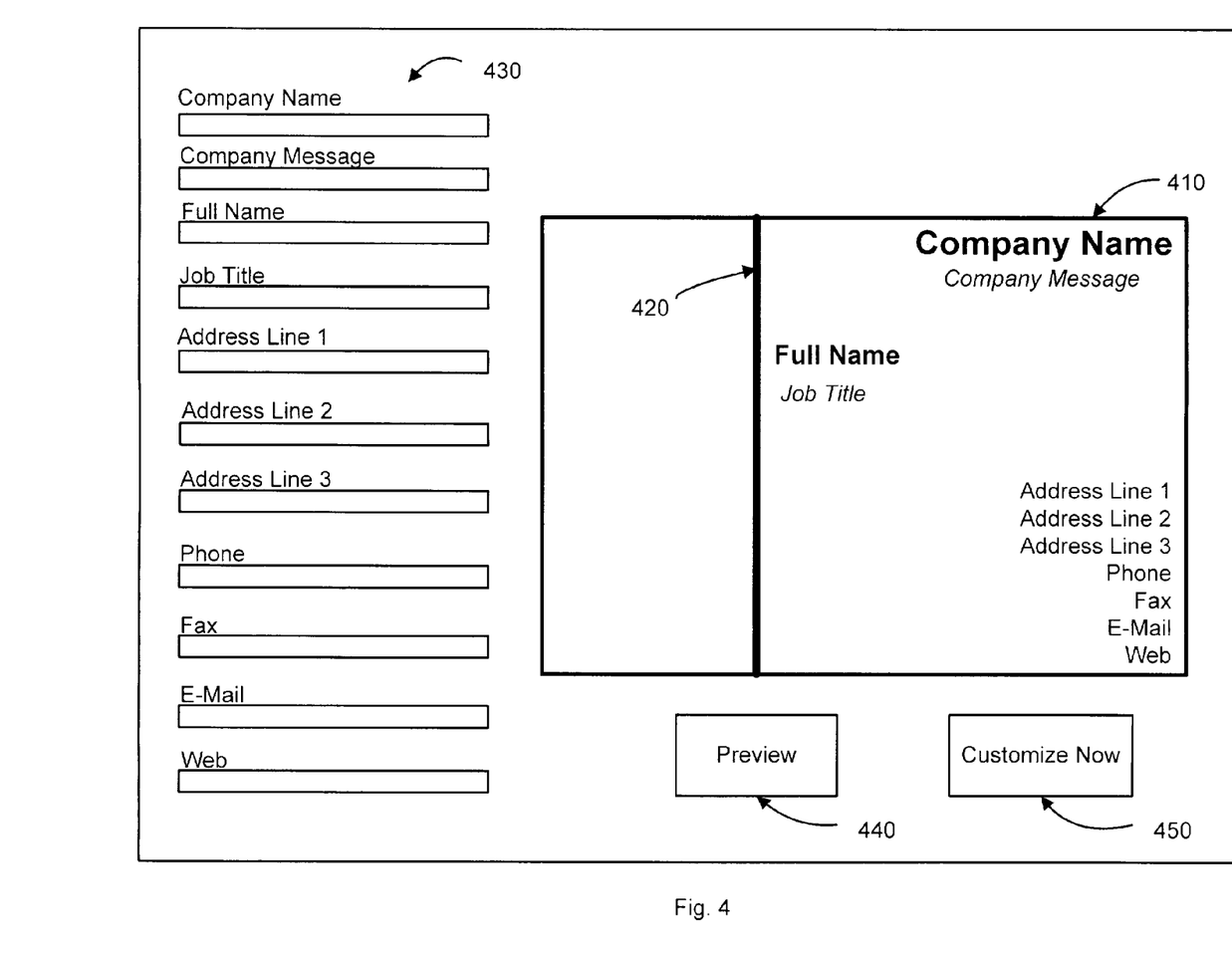

For the purpose of this discussion, it will be assumed that the user selects thumbnail image 301. In response to the user's selection of image 301, design tool 106 retrieves from server 110 the XML document description of the document corresponding to thumbnail image 301 and renders business card template 410. FIG. 4 represents the initial template customization screen displayed to the user. It will be understood that template designs will be displayed to the user in color and will typically include one or more lines, shapes, images, graphics, word art, and background effects. For clarity and simplicity of this presentation, template 401 will be discussed as having a single line 420 as its only design feature.

Some users may be satisfied with designing a document with no additional modification beyond the entering of the user's personal information. To provide a simple and straightforward interface for these users, the full range of editing tools are not immediately presented to the user. In FIG. 4, the user is presented with a set of text fields 430, each field corresponding to one item of information to be entered in the business card. Template 401 contains sample text indicating to the user the size and location where the user's corresponding entries will be displayed. The user can enter the user's desired information in some or all of the fields 430.

Figure 5:
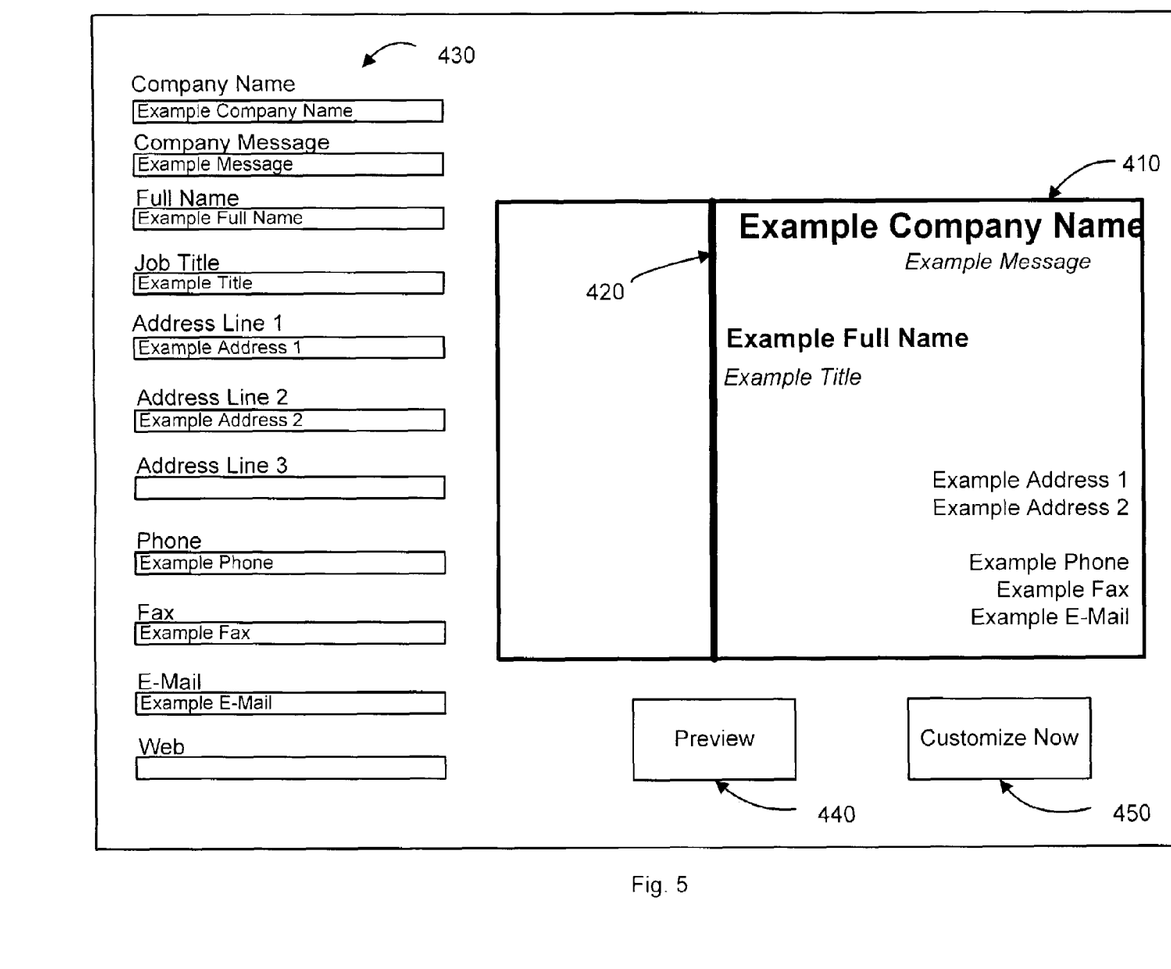

When the user desires to see template 410 updated with the user's information from fields 430, the user can click Preview button 440. In response to Preview button 440, design tool 106 will update template 410 to incorporate the user's information from fields 430. Referring to FIG. 5, an example where the user has entered information in some of fields 430 and clicked Preview 450 is shown. Design tool 106 has replaced the generic text of the original template 401 with the user's custom text.

Figure 6:
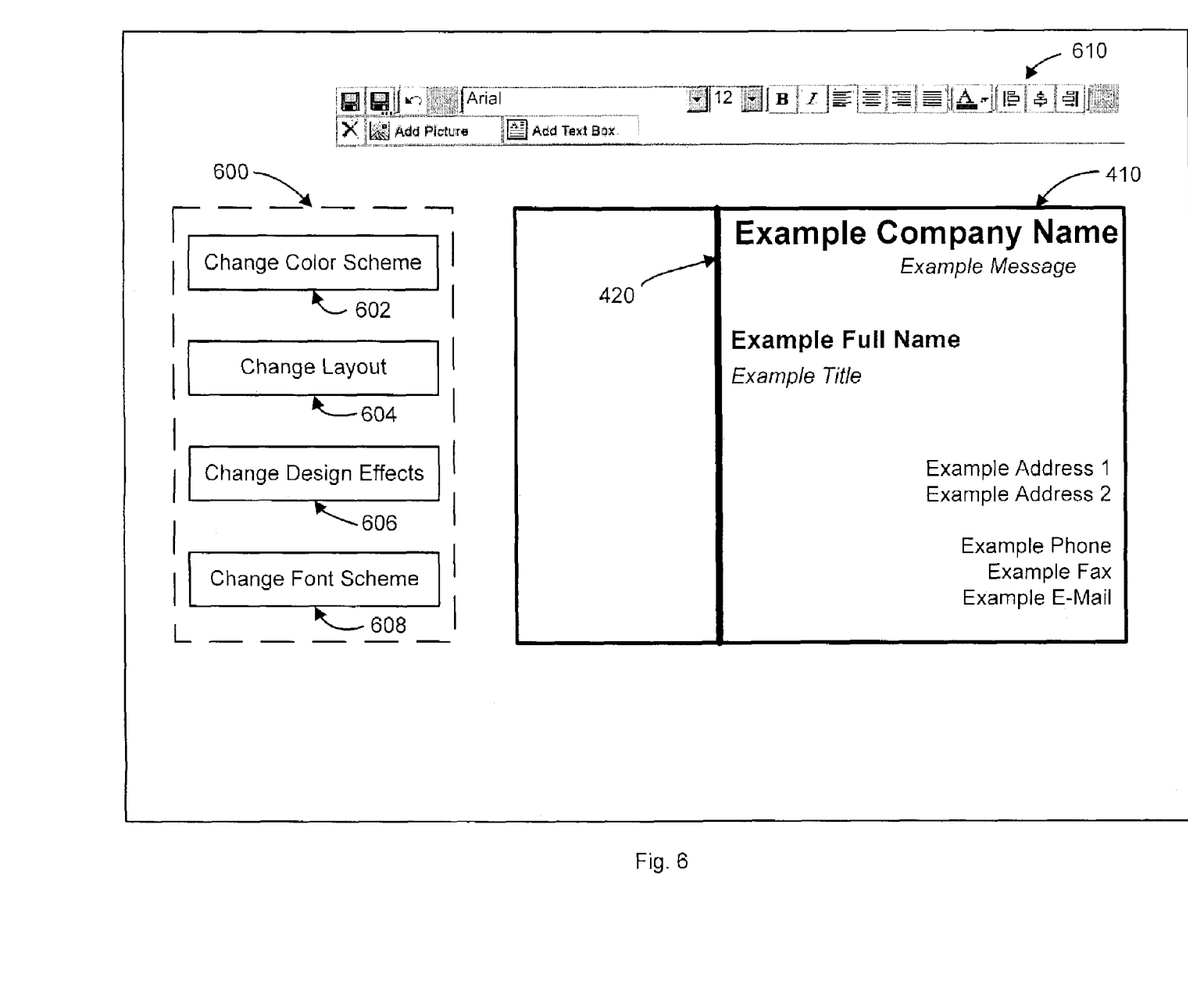

If the user desires to do additional customization of the electronic document, the user can click on Customize Now button 460 to display additional customization tools. The implementation of a limited level of editing, as discussed in connection with FIGS. 4 and 5, is a design choice by the service provider. The system could be designed to progress directly from a general selection screen, such as shown in FIG. 3, to a full editing screen, such as shown in FIG. 6. The service provider may charge a higher price to the user for accessing and using these additional tools to edit the document.

Referring to FIG. 6, when the user clicks on Customize Now 450, indicating the desire to use the additional customization tools, the user is presented with additional editing tools, represented by edit tool bar 610 and document controls 600. Edit Tool Bar 610 contains various buttons, controls and menus allowing the user to add additional text boxes, insert text, change the font, change font attributes, and perform other typical editing actions. The techniques for designing and using edit tool bars are well known in the art.

The user is also presented with additional active document controls 600 that enable the user to customize specific component features of the document. In FIG. 6, these document controls are identified as Change Color Scheme 602, Change Layout 604, Change Design Effects 606, and Change Font Scheme 608. Illustrative examples of the function and operation of these controls will be given below. First, the underlying structure of the documents will be discussed.

In the disclosed markup language design tool 106 that executes in the user's browser, a markup language document is comprised of a plurality of individual containers. Each container may contain text, an image, a shape, a line, word art or other content supported by the markup language. Each container has associated attributes, such as size and position. Depending on the content, the container may have various additional attributes. For example, text containers may define font-related parameters such as the font family, font color, and font weight. Containers with VML shapes may define parameters such as border, shadow, opacity, and fill image.

The template 410 electronic document is generated from separately defined and separately controllable layout and design descriptions. The document layout defines the position and dimensions of all containers in the document by defining the left, top, width, height and z-index position for each container in the document. This contrasts with prior art systems in that prior art systems, if they addressed the concept of a separately controllable "layout" at all, typically considered the layout to apply only to text elements. While this form of layout control gave the user some control, it often was unsatisfactory because a change in text position could result in text conflicting with images, design elements or the like. By including the size and position of all containers, not just text containers, in the layout definition, the present system provides for a more compatible relationship between layouts and designs. For text containers, the layout also defines the font size and specifies the "wash" effect allowing text to be placed and read on an image.

The document design will store design and style information for each container in the associated document layout. The specific information for each container will vary depending on the container contents. For example, for text containers, the design may specify the font color, the font style, font weight, and the border. For an image, the design may specify the border. For word art, the design may specify the font weight and the color. For shapes in VML or a similar language, the design may specify the border, color, path, shadow, opacity and fill image.

Rather than incorporate fixed color and font information into the design for every element, the system may advantageously be embodied to handle color and font information with separately defined and controlled color schemes and font schemes. A color scheme is a set of complementary colors pre-selected by the service provider to be applied as a group to a document design. In this case, rather than incorporating specific color information into the design definition for the document containers, the design definition would instead provide a reference to a color scheme index for some or all document elements, allowing the user to change the colors used in a document by changing the selected color scheme.

A font scheme is a set of complementary fonts or font weights and attributes that have been pre-selected by the service provider to be applied as a group to a document design. As with the color scheme, rather than incorporating specific defined font families, weights, and attributes into the design definition for text containers, the design would instead provide a reference to a font scheme index, allowing the user to change the type and appearance of the fonts used in the document by changing the selected font scheme.

Layouts that share the same number and type of containers are considered to form a layout family. Similarly, designs that define the style attributes for the same number and type of containers are considered to form a design family. A design family is compatible with a layout family only if the designs in the design family define style attributes for at least the number and type of containers in the layout family.

Figure 12:
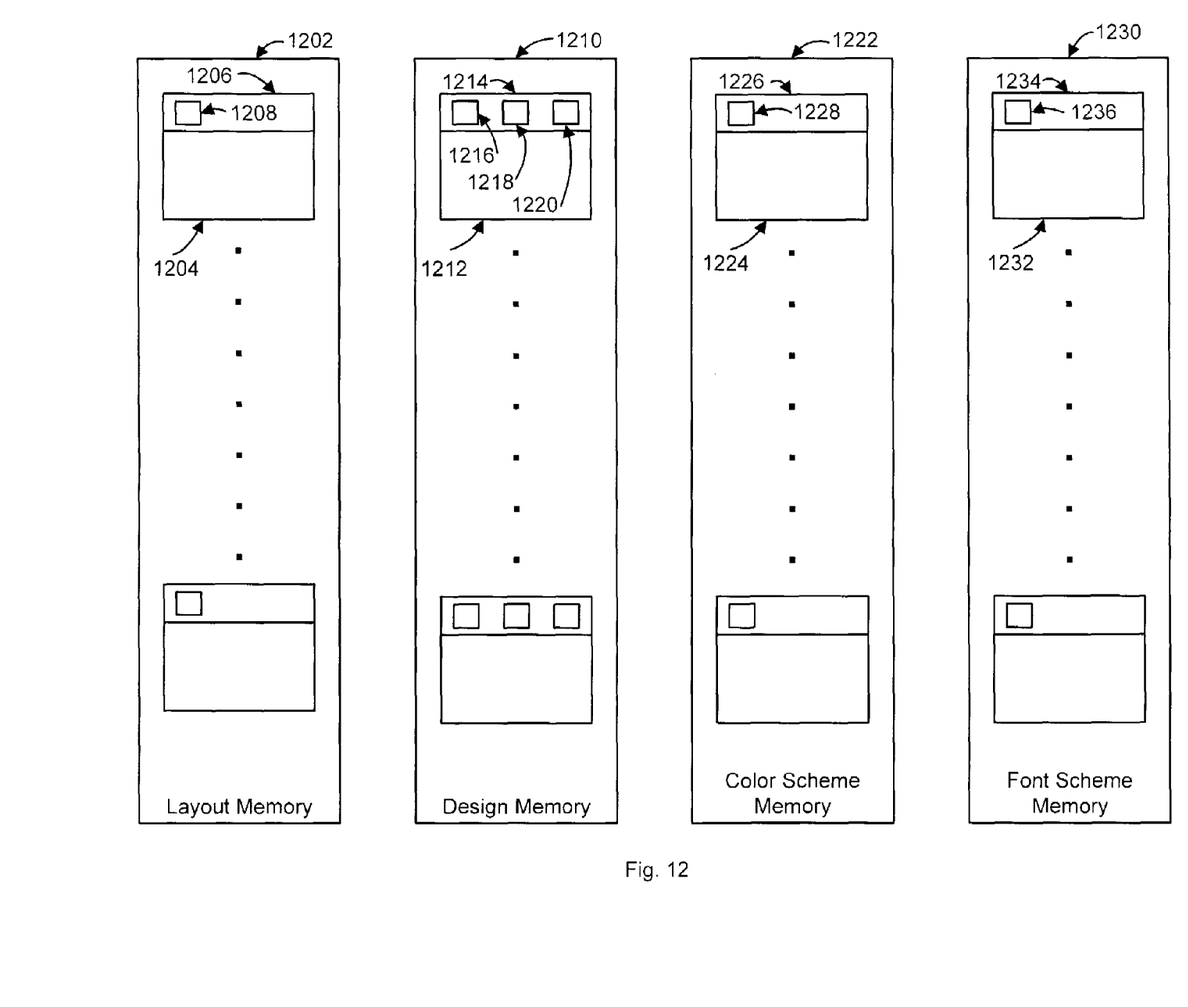
FIG. 12 is a representation of the organization of template memory 112

Referring to FIG. 12, the content of template memory 112 is depicted in greater detail. In FIG. 12, the information required to render a template in the user's browser is stored as separate layouts, design, color schemes and font schemes. Layout memory 1202 contains the template layout descriptions for the various product templates offered by the service provider. Each individual layout description, such as 1204, has an associated individual layout identifier 1206 that includes a family identifier 1208 for the family group indicating the design family or families to which the layout family belongs.

Design memory 1210 contains the template design descriptions for the various product templates offered by the service provider. Each individual design description, such as 1212, has an associated design identifier 1214 that includes the group identifier 1216 for the design group, default color scheme identifier 1218 and default font scheme identifier 1220. A design group is the set of similar designs prepared by the service provider that offer different effects or stylistic variations for the central theme or image.

Color scheme memory 1222 contains the descriptions of the various color schemes pre-selected by the service provider for use with at least some of the designs in design memory 1210. Each color scheme, such as 1224, has an individual identifier 1226. In general, all pre-designed color schemes are made available to the user for selection, if desired. In some cases, the service provider may decide that some color schemes are not appropriate for certain designs and will not be displayed to the user. In this case, color scheme identifier 1226 may also include design family identifier 1228, usable to identify the design families with which the color scheme is or is not compatible.

Font scheme memory 1230 contains the descriptions of the various font schemes pre-designed by the service provider for use with at least some of the designs in design memory 1210. Each font scheme, such as 1232, has an individual identifier 1234. Similarly to color schemes, all pre-designed font schemes will generally be presented to the user for review and possible selection. If the service provider decides that some font schemes will not be presented to the user in connection with certain designs, font scheme identifier 1234 may also include design family identifier 1236, usable to identify the design families with which the font scheme is or is not compatible.

The thumbnail sample document images displayed to the user for review and selection purposes, such as images 301-308 in FIG. 3, were each pre-designed by the service provider for the purpose of illustrating and attractively presenting the document templates available. The service provider selected and combined one of the available designs from memory 1210 with a compatible layout from layout memory 1202, a color scheme from color scheme memory 1222 and a font scheme from font scheme memory 1230 to create a representative example of a business card. The selected thumbnail image serves as the default starting point for the user in the user's process of customizing the document. Each thumbnail is associated with its component design and layout. When the user clicks on a thumbnail image, indicating a desire to prepare a document similar to that image, the associated layout and design are retrieved from server 110, transmitted to design tool 106 and processed in the user's browser to render the resulting template for the user. As discussed above, at the editing screen shown in FIG. 4, the user's editing options are limited. For example, the user can only enter the user's text in the default font and at the default location. If the user moves to the expanded customization screen, as represented in FIG. 6, the modular nature of the document organization allows the user to change any one of the components of the document while the others remain unchanged. This provides the user with significant flexibility in customizing the document to meet the user's needs and tastes.

Figure 7:
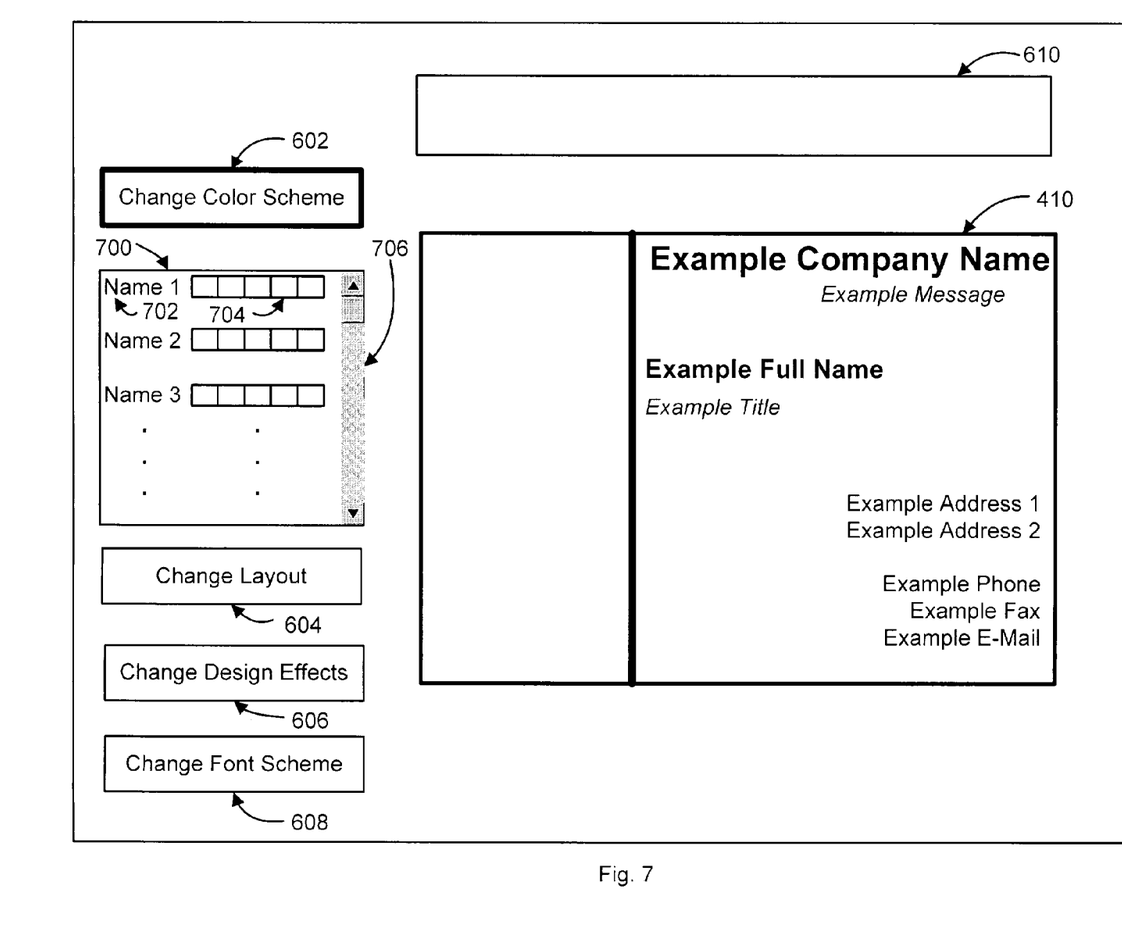

Referring to FIG. 7, a representation of screen 200 after the user has clicked on Change Color Scheme 602 is depicted. When a document control 602, 604, 606 or 608 is selected, its appearance is modified to be visually distinctive, indicated in FIG. 7 by the bold border for Change Color Scheme control 602. Drop down menu 700 is displayed beneath color control 620. Menu 700 displays a number of color schemes available for use with template 410. Each color scheme has an associated descriptive or suggestive name 702 to assist the user in recognizing and differentiating between the different schemes, indicated in FIG. 7 as Name 1, Name 2, and so forth, and an associated row of color boxes 704. Depending on the color scheme, some or all of the boxes associated with the color scheme will be displayed in appropriate colors to give the user a visual indication of the components of that color scheme. Because there will typically be more color scheme options than can be simultaneously displayed in window 700, scroll bar 706 allows the user to scroll through the menu to view all available color scheme choices. The complete color scheme table and associated indices is relatively small, therefore all color scheme information is retrieved from server 110 at the time the user enters the customization mode so as to be readily available in design tool 106. Other retrieval timing could be used, if desired.

To select a color scheme, the user moves the mouse cursor over a desired color scheme and clicks. The service provider may have determined that one or more containers in the document will not be variable by the user and will always appear in the same color. For these containers, the design will specify a fixed color. For those containers that are intended to have colors that can be varied by the user, the design will associate each container with at least one specific component of the color scheme. If the user selects a new color scheme, design tool 106 will modify template 410 to reflect the new colors as specified by the new color scheme.

Figure 8:
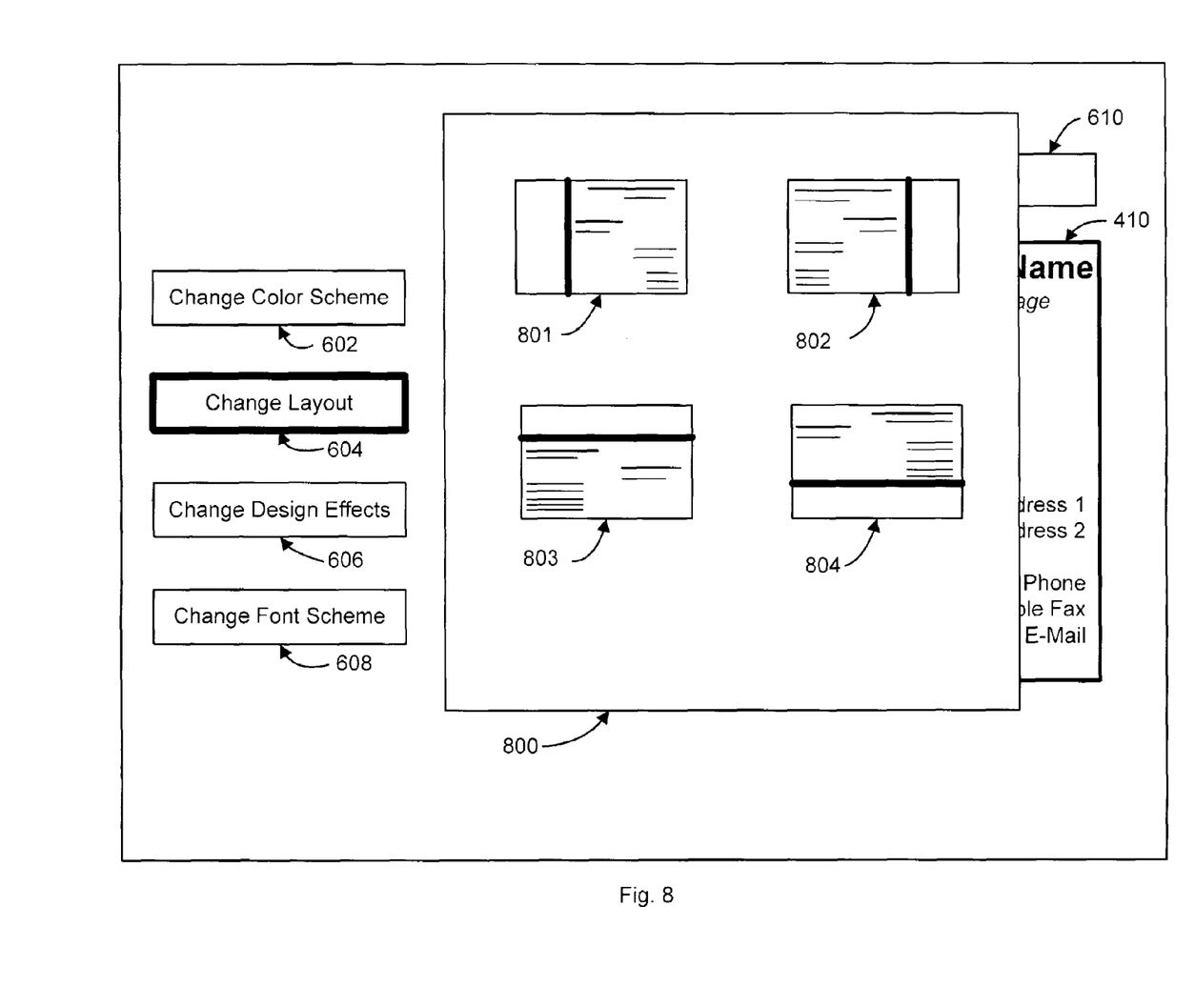

Referring to FIG. 8, a representation of screen 200 after the user has clicked on Change Layout 604 is depicted. When the user selects Change Layout 604, design tool 106 retrieves from server 110 the XML descriptions of the layouts in the corresponding layout family. For each received layout, design tool 106 generates an electronic document based on the received layout, the current design, color scheme and font scheme and the content already entered by the user in the document. Each document 801-804 is displayed in window 800 at a reduced size in a separate browser window 800. An image corresponding to the current document in template 410 is included for comparison. In this manner, the user is simultaneously presented with a number of accurate reduced-size images of the user's document, allowing the user to make an informed decision regarding which layout is the most attractive and desirable to the user. The number of alternatives displayed in window 800 will vary according to the number of different layouts designed by the service provider and received from server 110.

If the user, upon reviewing the images in window 800, desires to use a new layout to the document, the user moves the mouse cursor over a desired image in window 800 and clicks. In response to the user's request, window 800 is closed and the newly selected version of the document replaces the version of the document previously being displayed as template 410.

Figure 9:
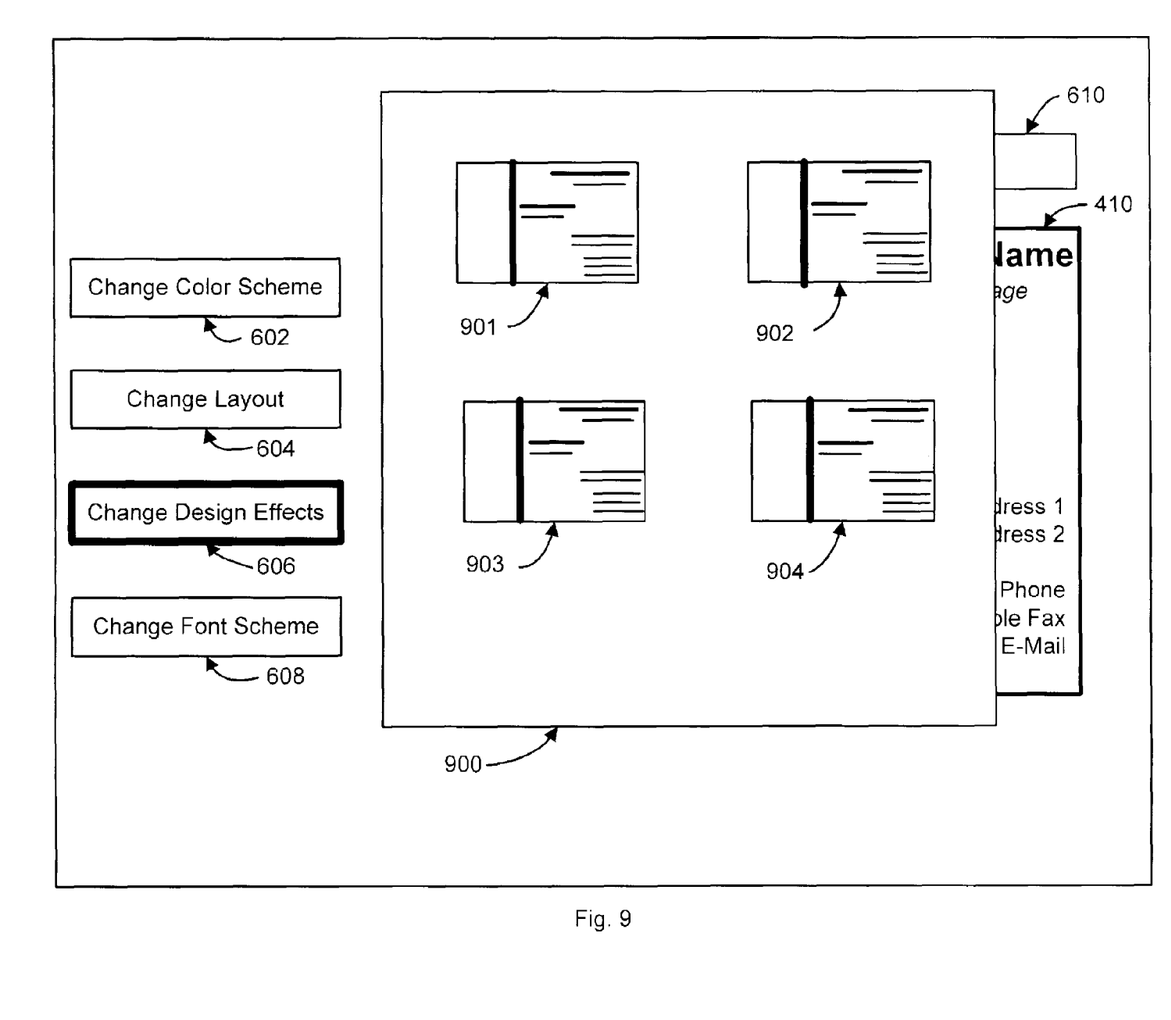

Referring to FIG. 9, a representation of screen 200 after the user has clicked on Change Design Effects 606 is depicted. When the user selects Change Design Effects 606, design tool 106 retrieves from server 110 the XML descriptions of the designs in the corresponding design group. For each received design, design tool 106 generates an electronic document based on the received design, the current layout, color scheme and font scheme and the content already entered by the user in the document. Each document 901-904 is displayed in a reduced size in a separate browser window 900. An image corresponding to current template 410 is included for comparison. In this manner, the user is presented simultaneously with accurate reduced-size images of different designs applied to the user's actual document, allowing the user to make an informed decision regarding which design is the most attractive and desirable to the user. The number of alternatives displayed in window 900 will vary according to the number of different designs prepared by the service provider and received from server 110.

If the user, upon reviewing the images in window 900, desires to use a new design in the document, the user moves the mouse cursor over a desired image in window 900 and clicks. In response to the user's request, window 900 is closed and the newly selected version of the document replaces the version of the document previously being displayed as template 410.

Figure 10:
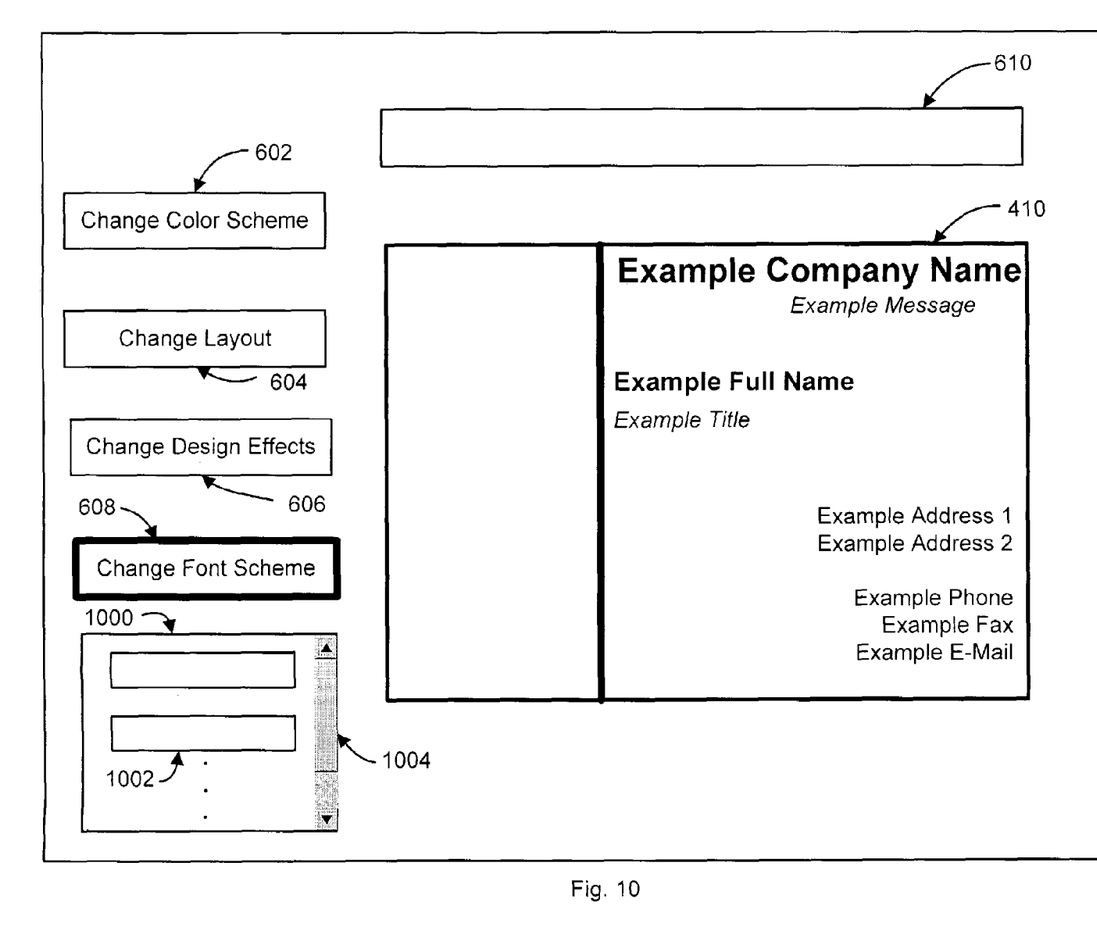
Figure 11:
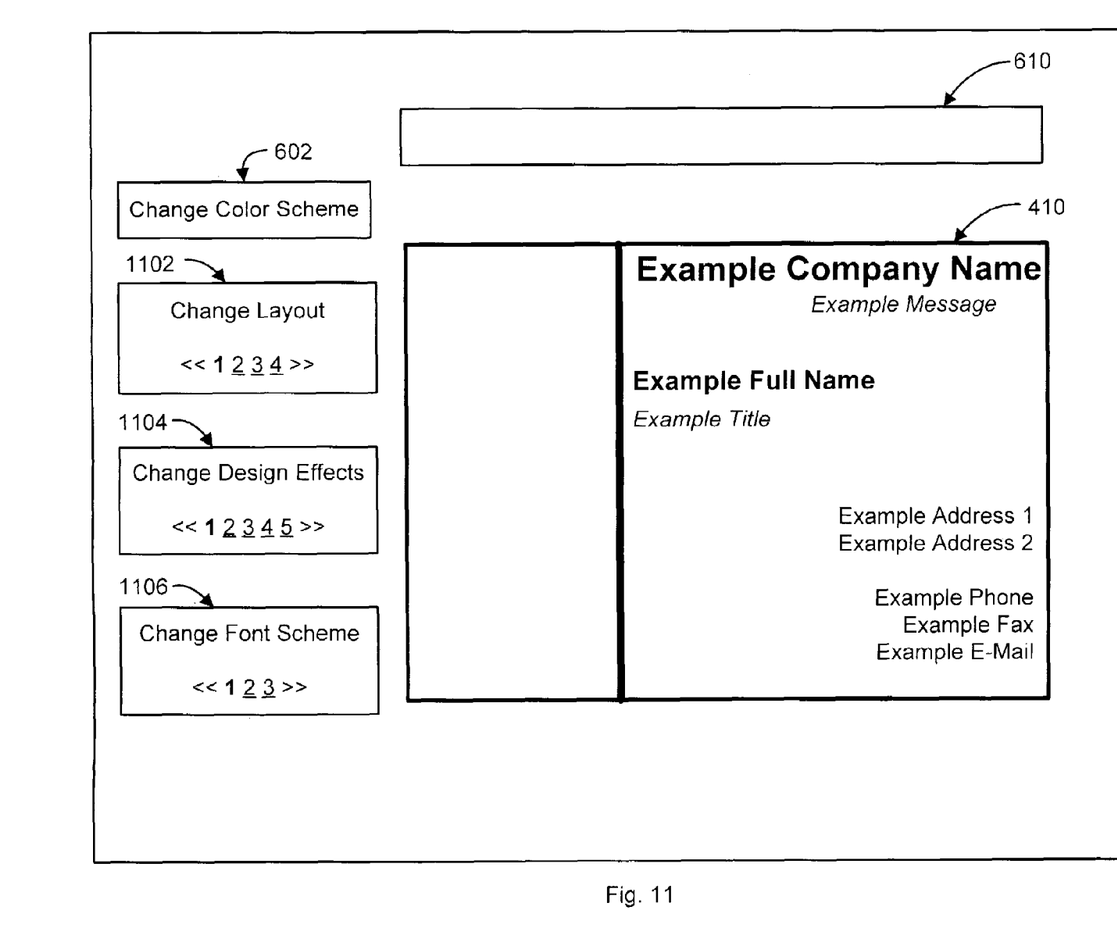

Referring to FIG. 10, a representation of screen 200 after the user has clicked on Change Font Scheme 608 is depicted. Drop down menu 1000 is displayed beneath font control 608. Menu 1000 displays the font schemes prepared by the service provider and available for use with the document being prepared in template 410. Each font scheme 1002 includes an example of the font elements of the font scheme. If the available font schemes cannot all be simultaneously displayed in window 1000, scroll bar 1004 will be made available. To select a font scheme, the user moves the mouse cursor over a desired scheme and clicks. Each text container in the design is associated with at least one specific component of the font scheme. If the user selects a new font scheme, design tool 106 will modify template 410 appropriately to reflect the newly selected fonts.

While one illustrative embodiment has been explained, alternate embodiments could be employed. For example, referring to FIG. 11, an implementation not requiring the generation of interim reduced size images is depicted. Instead of controls 604, 606 and 608, selection controls 1102, 1104 and 1106 are provided. Each control indicates to the user the number of choices of that type available for that particular document and which of the choices is currently active. In the example shown in FIG. 11, for the document currently being customized by the user, there are four possible layouts, five possible designs and three possible font schemes. The document template 410 currently being displayed is based on layout 1, design 1 and font scheme 1, indicated by the "1" being displayed in a visually distinctive manner to differentiate it from the other available choices. To view document 410 with another layout, design or font scheme, the user can position the mouse cursor over one of the double angle brackets or over one of the displayed numbers in 1102, 1104 or 1106 and click. In this case, design tool 106 would, if necessary, retrieve the selected layout, design or font scheme from server 110, generate the modified document and display the revised document in template 410. In this manner, the user can cause template 410 to be updated with a single click to reflect a new layout, design or font, avoiding the need to go through the multiple steps of clicking once to cause reduced size images to be generated and then clicking again on an image to cause the displayed document to be updated to reflect the choice. This same approach could also readily be applied to color schemes, if desired.

Alternate embodiments providing fewer user-controlled options could also be readily employed. For example, instead of offering the user the ability to select among several font schemes, pre-selected specific font information could be incorporated into the design for each text container. In this embodiment, the font family, font style and font weight for each text container would be defined directly in the design. Changing the font scheme would not be an option for the user and Change Font Scheme button 650 would not be required.

In yet other alternative embodiments, instead of generating custom thumbnail images in response to the user selection of controls 604 or 606, a set of thumbnail images for each different product template could be pre-generated by the service provider and stored at server 110 in thumbnail memory 113. In one embodiment using pre-generated thumbnail images, a thumbnail image is pre-generated and stored in thumbnail memory 113 for every possible combination of layout, design, color scheme and font scheme for that product. If a user were to, for example, click layout control 604, design tool 106 would retrieve thumbnail images reflecting the current design, color scheme and font scheme being viewed by the user in template 410 in combination with all available layouts. If the numbers of possible layouts, designs, color schemes and font schemes are significant, this approach would require generating, storing, searching and retrieving a large number of thumbnail images.

In another embodiment using pre-generated thumbnails, thumbnail memory 113 would contain a set of pre-generated thumbnails based on a selected default layout, design, color scheme and font scheme. Thumbnail images would be included for each available layout for card 304 in combination with the default design, color scheme and font scheme, for each available design in combination with the default layout, color scheme and font scheme, and for each available font scheme combined with the default layout, color scheme and design. This results in thumbnails that are less likely to reflect the current combination of layout, design, color scheme and font scheme in the template 410 being currently viewed by the user, but reduces the volume of thumbnails that need to be stored. Because these thumbnail images were generated based on the default settings for the product template, any earlier changes made by the user will not be indicated in the thumbnail. For example, the user may have earlier performed a color scheme change and now wishes to review other layout or design options. The color scheme change is not reflected in the pre-generated thumbnails so, to minimize possible user confusion in viewing the thumbnail images, the images are displayed in a gray scale rather than in color. This presents the choices in a fashion that eliminates the potentially confusing feature of color from the layout or design decision process.

In yet other embodiments, simplified systems offering the user a single integrated layout/design control could be employed. In one embodiment of this type, images would be displayed to the user representing alternate document versions with changes to two or more document components. If the user selects the single control, design tool 106 would display a plurality of thumbnail document images, each image based on different layout and design combinations. In another embodiment of this type, not involving the generation and display of reduced size images, a single control offering a plurality of selectable elements, similar to the type of controls depicted in FIG. 11, could be presented to the user. Each selectable control could be associated with a different combination of layout and design. If the user selected one of the elements, the displayed document would be updated to reflect the new combination of elements associated with the selected control element.

In the above-described manners and embodiments, a user is given substantially increased control over the design of the user's document without requiring the user to purchase, install and learn to operate desktop publishing software. While the invention has been described in various exemplary embodiments, the described embodiments are to be considered as illustrative rather than restrictive. The scope of the invention, therefore, is as indicated in the following claims and all equivalent methods and systems.

What is claimed is:

1. A computer-implemented electronic document method comprising retaining a plurality of document layouts, a plurality of document designs, and a plurality of document font schemes;

providing a document image based on a current layout, the current layout being one of the retained document layouts, a current font scheme, the current font scheme being one of the retained document font schemes, and a current design, the current design being one of the retained document designs;

providing first, second and third controls while at least a portion of the document image is available for viewing by the user, in response to user operation of the first control, generating a plurality of different document images for simultaneous viewing by the user, each of the different document images being based on at least the current design, the current font scheme, and a different one of the retained layouts, in response to user operation of the second control, generating a plurality of different document images for simultaneous viewing by the user, each of the different document images being based on at least the current layout, the current font scheme, and a different one of the retained designs, and, in response to user operation of the third control, generating at least one different document image for viewing by the user based on at least the current layout, the current design, and a different one of the retained font schemes.

2. The method of 1 further comprising retaining a plurality of pre-generated images based on combinations of at least some of the retained document layouts, retained document designs and retained document font schemes and wherein the images provided in response to user operation of the first, second or third control are selected from the plurality of retained pre-generated images.

3. The method of claim 1 wherein the different images are generated in response to user operation of the first, second or third control.

4. The method of claim 3 wherein the different images are further based on user-supplied document content.

5. The method of claim 4 further comprising receiving a request from the user to create a printed version of a document.

6. The method of claim 5 further comprising providing the requested document in electronic form to a printer for printing.

7. A computer-readable medium having embodied thereon a computer program for editing an electronic document comprising computer code adapted to receive a document layout from a plurality of retained layouts, a document design from a plurality of retained designs, and a document font scheme from a plurality of document font schemes;

generate an electronic document image based on the received layout, the received font scheme, and the received design.

provide first, second and third user-operable controls while at least a portion of the document image is available for viewing by the user, in response to user operation of the first control, generate a plurality of different document images for simultaneous viewing, each of the different document images being based on the current design, the current font scheme, and a different one of the retained layouts, in response to user operation of the second control, generate a plurality of different document images for simultaneous viewing, each of the different document images being based on the current layout, the current font scheme, and a different one of the retained designs, and, in response to user operation of the third control, generate at least one different document image based on the current layout, the current design, and a different one of the retained font schemes.

8. The computer program of claim 7 further comprising computer code adapted to retain a plurality of pre-generated images based on combinations of at least some of the retained document layouts, document designs and document font schemes and to provide images from the plurality of pre-generated images in response to user operation of the first, second or third control.

9. The computer program of claim 7 wherein the different images are generated in response to user operation of the first, second or third control.

10. The computer program of claim 9 wherein the different images are further based on user-supplied document content.

11. A computer-implemented method for creation of a document image, the method comprising displaying a first document image to a user, displaying a plurality of user-operable customization controls, including at least a layout control, a design control, and a font scheme control;

in response to user operation of the layout control, simultaneously displaying two or more different document images, each of the different images having the design of the first image, the font scheme of the first image, and a layout that is different from the layout of first image, in response to user operation of the design control, simultaneously displaying two or more different document images, each of the different images having the layout of the first image, the font scheme of the first image, and a design that is different from the design of the first image, and, in response to user operation of the font scheme control, displaying one or more different document images, each of the different images having the layout of the first image, the design of the first image, and a font scheme that is different from font scheme of the first image.

12. The method of claim 11 further comprising, in response to user selection of a document image for printing, providing the requested document image in electronic form to a printer.

* * * * *